UNITED STATES PATENT OFFICE.

JOHN E. ALLEN, OF SAN FRANCISCO, CALIFORNIA.

BUOYANT WATERPROOF COMPOSITION.

1,285,888.     Specification of Letters Patent.     Patented Nov. 26, 1918.

No Drawing.     Application filed December 11, 1917. Serial No. 206,690.

*To all whom it may concern:*

Be it known that I, JOHN E. ALLEN, a subject of the King of England, residing at San Francisco, in the county of San Francisco and State of California, have invented new and useful Buoyant Waterproof Composition, of which the following is a specification.

This invention relates to a composition which is primarily intended to be employed as a lining or filling in spaces such as those between the double bottoms of a ship hull and the like, although the ingredients from which the composition is formed are such, that the composition may be advantageously used for purposes other than those stated if desired.

The primary object of the invention is to provide a resilient, buoyant, water-proof composition of this character which is inexpensive of manufacture, light of weight and may be molded in any shape desired.

With these and other objects in view the invention resides in the combination of the ingredients hereinafter described and claimed.

The preferred combination of the ingredients will be described in the specification although it will be understood that minor changes in the ingredients and the proportions in which they are used may be made within the scope of the claims if desired.

The composition which may be advantageously employed for the purposes stated is 80% buoyant material which is bound together in a heterogeneous mass, of any size or shape desired, by a water-proof binding.

The buoyant material comprising the 80% of the composition consists of a mixture 20% of which is cork or other bark and the other 80% of the buoyant material is charcoal or other carbonaceous material. I prefer to use the cork and charcoal in granular form, the size of the granules depending upon the use to which the composition is to be put.

The binder which comprises the other 20% of the composition and by means which the cork and charcoal granules are held together and rendered water-proof consists of a mixture, 3% of which is rosin or some other suitable by-product of distillation. The other 97% of the binder is composed of ½ bituminous matter, preferably asphaltum, and ½ paraffin, although if desired some other suitable hydro-carbonaceous material may be substituted for the paraffin. The rosin is employed in connection with the asphaltum and paraffin as a hardening and stiffening agent.

The binder is applied to the buoyant material while hot and the application of the binder to the buoyant material may be made in any manner most convenient.

From the above described combination of ingredients it is apparent that a buoyant water-proof composition is provided which is light in weight and highly efficient for the purposes stated.

Having thus described the composition, what is claimed as new is:

1. A buoyant water proof composition consisting of a mixture 80% of which is ⅕ granulated cork and ⅘ charcoal, and a water-proof cementing substance.

2. A buoyant water proof composition consisting of a mixture of granulated cork and charcoal, a water-proofing material, and a hardening and stiffening agent in said material.

3. A buoyant water proof composition consisting of a mixture of granulated cork and charcoal, and a binder comprising bituminous material, paraffin, and rosin.

4. A buoyant water proof composition consisting of a mixture of granulated cork and charcoal, and a cementing agent comprising asphaltum, paraffin, and rosin.

5. A buoyant water proof composition consisting of a mixture of granulated buoyant material, a binder 3% of which is rosin and the other 97% equal parts of asphaltum and paraffin.

6. A buoyant water proof composition consisting of a mixture of granulated light bark and charcoal, and a binder comprising rosin, asphaltum and paraffin.

In testimony whereof I affix my signature.

JOHN E. ALLEN.